Patented Oct. 14, 1930

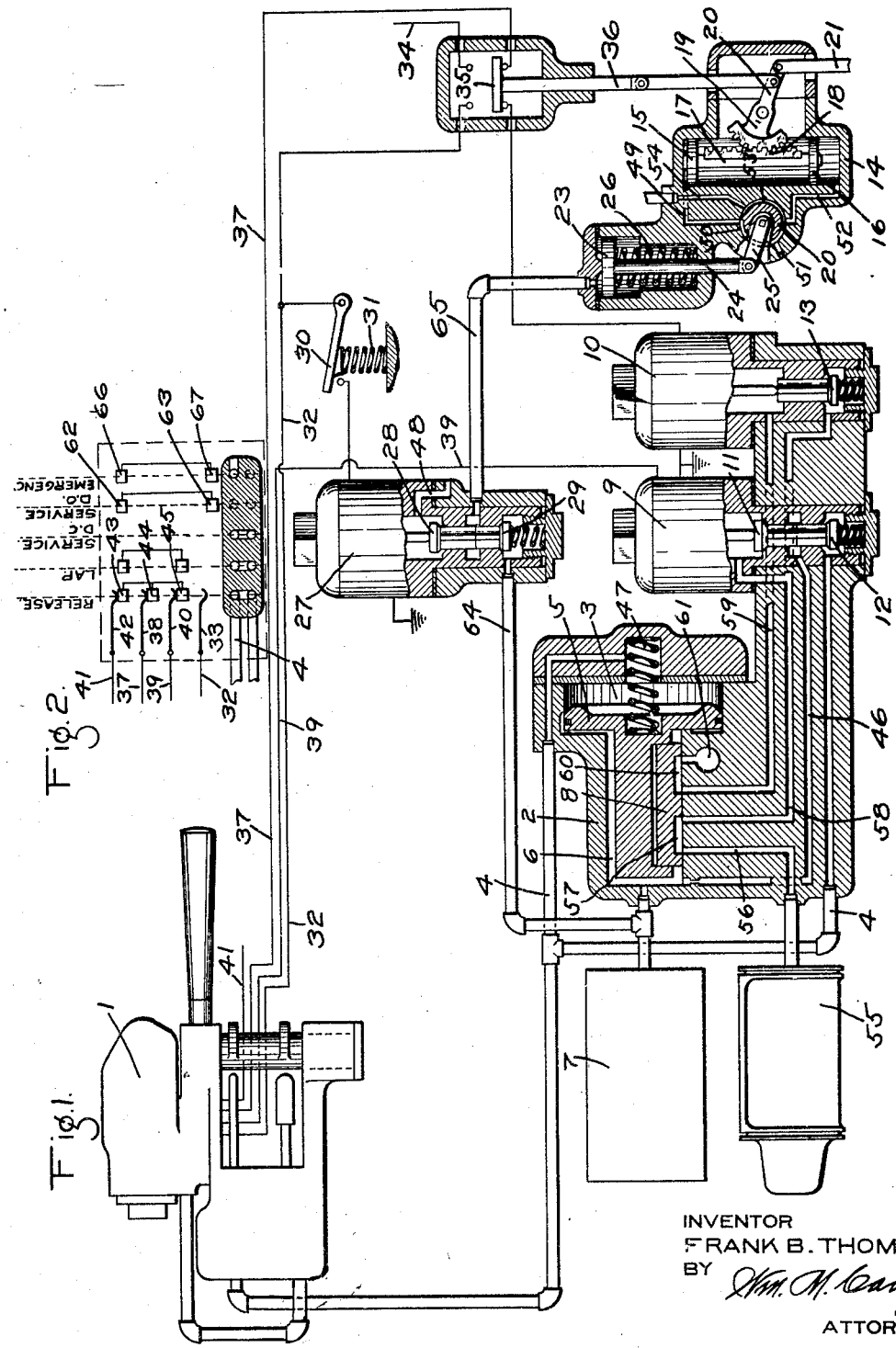

1,778,129

UNITED STATES PATENT OFFICE

FRANK B. THOMAS, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

DOOR AND BRAKE CONTROL DEVICE

Application filed May 10, 1928. Serial No. 276,597.

This invention relates to car door and brake controlling devices, and more particularly to an electro-pneumatically controlled door and brake controlling equipment.

One object of my invention is to provide a car door and brake controlling equipment in which a passenger on the car may prevent the release of the brakes under certain conditions.

Another object of my invention is to provide a door and brake controlling equipment having means under the control of a passenger for controlling the opening or closing of a car door and the release of the brakes.

Other objects and advantages will appear in the following more detailed description of the invention.

In the accompanying drawing; Fig. 1 is a diagrammatic view, partly in section, of a car door and brake controlling equipment embodying my invention; and Fig. 2 a diagrammatic development of the door and brake controlling switch and brake valve device.

As shown in the drawing, the equipment may comprise a combined brake valve and brake switch device 1 for controlling the car doors and the brakes, preferably similar to that disclosed in the pending application of Joseph C. McCune, Serial No. 235,450, filed November 25, 1927.

The equipment includes an emergency valve device 2 comprising a casing having a piston chamber 3 connected to an emergency brake pipe 4 and containing a piston 5 and a valve chamber 6 connected to the usual main reservoir 7 and containing a slide valve 8 adapted to be operated by piston 5.

For controlling the brakes electrically, a service magnet 9 and a release magnet 10 are provided. The service magnet 9 is adapted to operate double beat valves 11 and 12 and the release magnet a valve 13.

The car doors are controlled by a door engine 14 comprising a casing having a piston cylinder containing pistons 15 and 16 connected together by a stem 17 carrying a rack bar 18. The teeth of the rack bar engage the teeth of a gear segment 19 and said gear segment is provided with a lever arm 20, to the outer end of which is connected a rod 21 for operating the car door.

The supply and release of fluid under pressure to and from the pistons 15 and 16 is controlled by a rotary valve 22 and said valve is operable by a piston 23 having a stem 24 which is connected to the valve by an arm or lever 25.

A spring 26 urges the piston 23 in one direction and the supply and release of fluid under pressure to the opposite side of the piston is controlled by a magnet valve device comprising a magnet 27 and double beat valves 28 and 29 adapted to be operated by said magnet.

The circuit of magnet 27 is controlled by a treadle 30 adapted to be depressed by a passenger entering or leaving the car and normally held in a position to open the magnet circuit by a spring 31. The circuit wire 32 of magnet 27 leads to a contact finger 33 in the door and brake controlling switch and the circuit wire 32 is also adapted to be connected to a current supply wire 34 by the operation of a switch member 35 which is carried by a rod 36, operatively connected to the lever arm 20.

The circuit wire 37 for the release magnet 10 is connected to a contact finger 38 in the door and brake switch and connection of the circuit wire 37 to the magnet 10 is controlled by the switch member 35. The circuit wire 39 of the service magnet 9 is connected to a contact finger 40 in the door and brake switch. A current supply wire 41 is connected to a contact finger 42.

In operation, when the brake valve and brake switch device is in release position, the contact fingers 42, 38, and 40 engage electrically connected contacts 43, 44, and 45, so that current is supplied from the current supply wire 41 to the release magnet wire 37 and the service magnet wire 39.

The service magnet 9 is therefore energized, so that the valve 11 is held seated, while the valve 12 is held unseated. With the valve 12 unseated, fluid under pressure is supplied from the main reservoir 7, through passage 46 to the emergency brake pipe 4. The valve chamber 6 being open to the main reservoir 7 and the piston chamber 3 being supplied with fluid from the main reservoir, the fluid pressures on piston 5 are balanced, permitting the spring 47 to maintain piston 5 in its normal release position, as shown in the drawing.

The treadle 30 not being depressed, the circuit of magnet 27 is open, so that magnet 27 is deenergized, permitting the valve 29 to seat and the valve 28 to be unseated.

With the valve 28 unseated, the piston chamber above piston 23 is vented to the atmosphere through port 48, permitting the spring 26 to maintain piston 23 in its upper position, as shown in the drawing.

In this position, the rotary valve 22 is adapted to connect a passage 49, leading to piston 15, through a cavity 50 in the valve, with an exhaust port 51, while a passage 52, leading to piston 16, is connected through cavity 53 with a fluid pressure supply passage 54.

The pistons 15 and 16 are therefore maintained in their upper positions, by fluid pressure acting on piston 16, in which position the car doors controlled by the rod 21 are held closed. With the car doors held closed, the rod 36 holds the contact member 35 so as to close the circuit from the release magnet wire 37 to the release magnet 10 and with brake valve and brake switch in release position, the release magnet 10 is energized and the release valve 13 is held open. The emergency slide valve 8 being in release position, the brake cylinder 55 is connected to the atmosphere through passage 56, cavity 57 in slide valve 8, passage 58, past the open valve 13, to passage 59, cavity 60 in slide valve 8 and exhaust port 61.

In the release position of the brake switch, the circuit wire 32 is not supplied with electric current, so that even if the treadle 30 were depressed by a passenger on the car, current would not be supplied to energize the magnet 27.

If the operator wishes to effect a service application of the brakes without opening the car doors, he moves the brake switch to service doors closed position, in which current is not supplied to the circuit wires 37 and 39 and consequently, the magnets 10 and 9 are deenergized. Release magnet 10 being deenergized, the valve 13 is seated, cutting off the exhaust from the brake cylinder 55 and the service magnet 9 being deenergized, the valve 12 is seated and the valve 11 unseated, so that fluid under pressure is supplied to the brake cylinder through passage 46, past the open valve 11 to passage 58 and thence through cavity 57 and passage 56 to the brake cylinder.

The car doors cannot be opened in this position, even if a passenger steps on the treadle 30, since electric current is not supplied in this position to the circuit wire 32.

If the operator wishes to permit the car doors to be opened, he turns the brake valve and brake switch to the service doors open position, in which an electric service application is effected as in the service doors closed position and in addition, current is supplied through connected contacts 62 and 63 to the circuit wire 32.

The supply of current to the circuit wire 32 will not effect the energization of magnet 27, however, unless a passenger steps on and depresses the treadle 30, so as to close the circuit to the magnet 27. If the treadle is depressed, then the magnet 27 will be energized, causing the valve 28 to be seated and the valve 29 unseated.

The unseating of valve 29, permits the flow of fluid under pressure from the main reservoir 7, through pipe 64, past the open valve 29 to pipe 65, so that the piston 23 is moved by fluid under pressure and the rotary valve 22 is operated to cause cavity 53 to connect passage 54 with passage 49 and to cause cavity 50 to connect passage 52 with exhaust port 51.

Fluid under pressure is then supplied to piston 15 while piston 16 is vented to the atmosphere and consequently the pistons 15 and 16 are shifted downwardly, causing the rod 21 to be operated so as to effect the opening of the car doors.

The movement to open the car doors also causes the rod 36 to be shifted, so that the circuit from wire 37 to the release magnet 10 is opened, while the contact member 35 operates to close a circuit from current supply wire 34 to the circuit wire 32.

If the car operator should attempt to close the car doors or release the brakes, he cannot do so, as long as a passenger holds the treadle 30 depressed, since with the treadle depressed, current is supplied from the current supply wire 34 to energize the magnet 27, even though the circuit of the wire 32 is opened at the brake switch by the operator.

The door being opened, the circuit from wire 37 to the release magnet 10 is held open, so that the operator will be unable to energize the release magnet 10 by movement of the brake switch to release position.

When there is no passenger holding the treadle 30 depressed, the magnet 27 will be deenergized and the valve 29 will be seated and the valve 28 unseated. The piston 23 is then vented to the atmosphere, and the rotary valve 22 is moved by the piston 23 to the doors closed position, in which fluid under pressure is supplied to piston 16 while piston 15 is vented to the atmosphere.

The pistons 15 and 16 are therefore shifted to their upper positions, by which movement, the rod 21 is operated to close the car doors. The movement to close the car doors, causes the rod 36 to be shifted so that the contact member 35 closes the circuit from the release circuit wire 37 to the release magnet 10. The brakes may now be released when the operator moves the brake switch to release position, in which current is supplied to wire 37.

In emergency position of the brake valve and brake switch, the emergency brake pipe 4 is vented to the atmosphere, so as to cause the operation of the emergency valve device 2, to effect an emergency application of the brakes. In emergency position of the brake switch, current is supplied through connected contacts 66 and 67 to the circuit wire 32, so that when a passenger depresses the treadle 30, the magnet 27 is energized and the car doors are opened, in the same manner as described in connection with the movement of the brake switch to the service doors open position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a door engine having pistons operated by fluid under pressure for controlling a car door, of electrically controlled means for controlling the release of the brakes and means operatively connected to said pistons for preventing the operation of said electrically controlled means to effect the release of the brakes upon movement of said pistons to effect the opening of the door.

2. The combination with a door engine for controlling the opening and closing of a car door, of electrically controlled means operated upon deenergization for cutting off communication through which fluid is released for effecting the release of the brakes and means operated upon movement of said door engine to open the car door for effecting the deenergization of said electrically controlled means.

3. The combination with a door engine for controlling the opening and closing of a car door, of a magnet valve device adapted upon energization to effect the release of the brakes and upon deenergization to prevent the release of the brakes and a switch device associated with said door engine for controlling the circuit of said magnet valve device.

4. The combination with a door engine for controlling the opening and closing of a car door, of a magnet valve device adapted upon energization to effect the release of the brakes and upon deenergization to prevent the release of the brakes, and a switch device operated when the door engine is in position for closing the car door for closing the circuit of said magnet valve device and when the door engine is in position for opening the car door for opening said circuit.

5. The combination with a door engine for controlling a car door, of a magnet valve device for controlling the operation of said door engine, a magnet valve device for controlling the release of the brakes, and means controlled by said door engine for controlling the circuits of said magnet valve devices.

6. The combination with a door engine for controlling a car door, of a magnet valve device for controlling the operation of said door engine, a magnet valve device for controlling the release of the brakes, and a switch device operating with said door engine for controlling the circuits of said magnet valve devices.

7. The combination with a door engine for controlling a car door, of a magnet valve device for controlling the operation of said door engine, a magnet valve device for controlling the release of the brakes, and a switch device adapted in the door closing position of said door engine to close the circuit to the brake release magnet valve device and open the circuit to the door engine controlling magnet valve device and in the door opening position of said door engine to open the circuit to the brake release magnet valve device and to close the circuit to the door engine controlling magnet valve device.

In testimony whereof I have hereunto set my hand.

FRANK B. THOMAS.